United States Patent
Xu et al.

(10) Patent No.: US 9,542,362 B2
(45) Date of Patent: Jan. 10, 2017

(54) APPARATUS AND A METHOD FOR LOGICALLY PROCESSING A COMPOSITE GRAPH IN A FORMATTED DOCUMENT

(71) Applicants: Peking University Founder Group Co., Ltd., Beijing (CN); Founder Apabi Technology Limited, Beijing (CN); Peking University, Beijing (CN)

(72) Inventors: Canhui Xu, Beijing (CN); Zhi Tang, Beijing (CN); Xin Tao, Beijing (CN); Cao Shi, Beijing (CN)

(73) Assignees: Peking University Founder Group Co., Ltd., Beijing (CN); Founder Apabi Technology Limited, Beijing (CN); Peking University, Beijing (CN)

( * ) Notice: Subject to any disclaimer, the term of this patent is extended or adjusted under 35 U.S.C. 154(b) by 382 days.

(21) Appl. No.: 14/095,682

(22) Filed: Dec. 3, 2013

(65) Prior Publication Data

US 2014/0337719 A1    Nov. 13, 2014

(30) Foreign Application Priority Data

May 10, 2013   (CN) .......................... 2013 1 0172879

(51) Int. Cl.
    *G06F 17/22*    (2006.01)
    *G06F 17/21*    (2006.01)
    *G06F 3/0484*   (2013.01)
    *G06F 17/27*    (2006.01)

(52) U.S. Cl.
    CPC .......... *G06F 17/212* (2013.01); *G06F 3/0484* (2013.01); *G06F 17/2705* (2013.01)

(58) Field of Classification Search
    CPC .. G06F 17/212; G06F 3/0484; G06F 17/2705; G06K 9/00463
    See application file for complete search history.

(56) References Cited

U.S. PATENT DOCUMENTS

| 5,475,805 | A  | * | 12/1995 | Murata ................. G06F 17/211 715/201 |
| 6,847,979 | B2 | * | 1/2005  | Allemang ......... G06F 17/30731 345/440 |
| 7,895,148 | B2 | * | 2/2011  | Ma ........................ G06Q 10/10 706/45 |

(Continued)

Primary Examiner — Maikhanh Nguyen
(74) Attorney, Agent, or Firm — McAndrews, Held & Malloy, Ltd.

(57) ABSTRACT

The present invention provides an apparatus for logically processing a composite graph in a formatted document, the apparatus comprising: a composite graph block extraction unit, used to extract a composite graph block in the formatted document; a document parsing unit, used to parse the formatted document to obtain a text element contained therein; a cutline element extraction unit, used to extract a cutline element from the text element; a correlativity detection unit, used to detect correlativity between the composite graph block and the cutline element; a correlativity storage unit, used to store the detected correlativity. The present invention also provides a method for logically processing a composite graph in a formatted document. According to the technical scheme disclosed in the present invention, it is easily achieve layout understanding of the composite graph in a graph-text mixed layout of the formatted document, so as to avoid a logical error.

8 Claims, 7 Drawing Sheets

(56) References Cited

U.S. PATENT DOCUMENTS

| | | | | |
|---|---|---|---|---|
| 7,933,915 B2* | 4/2011 | Singh | ............... | G06F 17/30958 |
| | | | | 707/760 |
| 8,503,767 B2* | 8/2013 | Sun | ............... | G06K 9/468 |
| | | | | 382/159 |
| 9,035,949 B1* | 5/2015 | Oberheu | ............... | G06T 11/206 |
| | | | | 345/440 |
| 9,098,798 B2* | 8/2015 | Pan | ............... | G06N 7/005 |
| 2011/0064301 A1* | 3/2011 | Sun | ............... | G06K 9/468 |
| | | | | 382/159 |
| 2011/0087959 A1* | 4/2011 | Qiu | ............... | G06F 17/212 |
| | | | | 715/234 |
| 2012/0303573 A1* | 11/2012 | Pan | ............... | G06Q 50/01 |
| | | | | 706/52 |

* cited by examiner

Figure 5A

APPARATUS AND A METHOD FOR LOGICALLY PROCESSING A COMPOSITE GRAPH IN A FORMATTED DOCUMENT

CROSS-REFERENCE TO RELATED APPLICATIONS/INCORPORATION BY REFERENCE

This patent application makes reference to, claims priority to, and claims benefit from Chinese Patent Application No. 201310172879.3 which was filed on May 10, 2013 with the Chinese Patent Office.

Chinese Patent Application No. 201310172879.3 filed on May 10, 2013, with the Chinese Patent Office, is hereby incorporated herein by reference in its entirety.

TECHNICAL FIELD

The present invention relates to the electronic document format conversion technical field, and specifically relates to an apparatus for logically processing a composite graph in a formatted document and a method for logically processing the composite graph in the formatted document.

BACKGROUND

According to the generating process of a formatted document, a document is a collection of data and structures, specifically including content data, physical structure and logical structure. Content data refers to data such as text, images, graphs, etc. Physical structure is a description of the layout and combination of the content data in a page, and includes for example a text line, a text block, a chart, etc. Logic structure is a description of the information reflected by the content data and the relationship between the information, includes not only the logical attribute of a page element, such as a text paragraph, an abstract, a title, a table, etc., but also the hierarchical relation of the document and the logical relation between the document elements, such as the correlativity between an image and a cutline, etc.

Document analyzing is to extract the document physical structure, while document understanding is to establish mapping relation between the physical structure and the logic structure. For the document analyzing task, the available input is the final form of the document, neither the physical information nor the logical structure information is explicitly reflected, the logic model and physical model that are used in generating the document need to be reversely deduced, so as to maximally recover the physical and logic structure of the document. In practical applications, readability required by the mobile device makes the recovery of the physical and logical structure become a priority for all.

In the recovery of the physical and logic structure, it is possible to extract the logic structure information of the document from the page hierarchy, label the physical structure block extracted from the page according to its logic function. Currently, the page logical structure analysis based on a traditional image document is benefited from the development in the field of artificial intelligence. The development of the logic structure analysis is turning from a method based on priori rules to a method based on machine learning. Differs from a traditional image document analysis method, the information provided by a formatted document can assist the layout understanding. But in a fixed formatted document, there are a large number of spliced elements, as well as figure layers superimposed with each other. These data cannot be used to construct the logic structure of the document directly, but need to be operated, such as spliced, superimposed etc. according to spatial relationship; afterwards, the content showed by them can be determined. Classifying as well as recognizing and labeling the non-text objects in a page is one of the emphases of document understanding, among which, both analyzing and understanding the composite graph of a graph-text mixed arrangement layout are challenging.

Therefore, a new logic process technology on processing the composite graph in a formatted document is needed, which can perform an appropriate logic process to the composite graphs split from a formatted document, so as to make it is easy to perform layout understanding to the composite graph in a graph-text mixed arrangement layout in a formatted document, thus to avoid logic errors.

SUMMARY

Based on the above-mentioned problem, the present invention provides a new logic process technology for processing a composite graph in a formatted document, which can carry out an appropriate logic process to the composite graphs which are split from a formatted document, make it is easy to process layout understanding to the composite graph in a graph-text mixed arrangement layout in a formatted document, so as to avoid a logic error.

In view of this, the present invention provides an apparatus for logically processing a composite graph in a formatted document, comprising: a composite graph block extraction unit, used to extract the composite graph block in the formatted document; a document parsing unit, used to parse the formatted document to obtain a text element included therein; a cutline element extraction unit, used to extract cutline elements from the text elements; a correlativity detection unit, used to detect correlativity between the composite graph block and the cutline elements; a correlativity storage unit, used to store the detected correlativity.

In this technical scheme, the composite graph block includes a picture and a character in or around the picture, etc. in a formatted document. Extracting a composite graph block refers to taking these pictures, characters as a whole, and split it from a portion of the formatted document, such as the text, etc., so as to carry out an appropriate typesetting process to the composite graph while rearranging the stream of the formatted document. However, due to typesetting the document, an interval between the picture and the cutline (for instance, located below the picture, including the title of the figure or the texts describing the picture, etc.) is far. In order to extract the composite graph block accurately, the cutline will be separated from the picture, which means, the picture is split to a composite graph block, while the picture is reserved to another partial of the formatted document, which leading to the fact that although the splitting is achieved in the physical structure, there is still a problem existing in the logic structure. The scheme therefore establishing correlativity between the composite graph block and the cutline element, so as to establish a relation between the composite graph block and the cutline element in the logic structure. Thus makes the process of splitting a composite graph in a formatted document being more precise and reasonable.

In above-mentioned technical scheme, preferably, further comprises: an information acquisition unit, used to obtain characteristic attribute information of the composite graph block; an element classification unit, used to classify the elements contained in the composite graph block according to the characteristic attribute information; a composite graph processing unit, used to reserve the in-text-illustration composite graph in the composite graph block and filter other elements according to classification result, so as to be used by the correlativity detection unit to detect correlativity between the in-text-illustration composite graph and the cutline element.

In this technical scheme, the composite graph block contains an in-text-illustration composite graph and other elements, such as a figure trademark, a formula, a column line, a header, a footer, a decorative composite graph, etc., these elements may result in impacting the determination on a real scope corresponding to the in-text-illustration composite graph while determining the scope corresponding to the composite graph area. For example, the scope corresponding to the in-text-illustration composite graph is determined by its minimal circum-rectangle. If not filtering other elements, it might cause the rectangle being larger than its actual scope, thus the contents that are not cutline elements might be regarded as the cutline elements incorrectly, which results in a logic error.

In above-mentioned technical scheme, preferably, further comprises: a label adding unit, used to add a corresponding logic label to each element in the composite graph block, to symbolize the classification each element belonging to; and the correlativity storage unit, also used to store the logic label and/or an identification of the element corresponding to the logic label.

In this technical scheme, adding a logic label to each element, so as to view and manage the logic relativity corresponding to various elements, thus obtains a better display effect after stream transforming the formatted document.

In above-mentioned technical scheme, preferably, the correlativity detection unit further comprises: a number determining subunit, used to determine the number of the in-text-illustration composite graphs contained in the composite graph block; a distance analyzing subunit, if the composite graph block contains only one in-text-illustration composite graph, the distance analyzing subunit is used to select a cutline element that distances to the in-text-illustration composite graph smaller than a preset distance, and use it as a cutline element relating to the in-text-illustration composite graph; a bipartite graph analyzing subunit, if the composite graph block contains multiple in-text-illustration composite graphs, the bipartite graph analyzing subunit is used to make the multiple in-text-illustration composite graphs and all of the parsed cutline elements as a vertex of a bipartite graph respectively, so as to utilize the bipartite graph to determine correlativity between the multiple in-text-illustration composite graphs and the cutline elements.

In this technical scheme, using a close distance principle and a dichotomy optimal matching method to realize recognition of the correlativity between the in-text-illustration composite graph and the cutline elements, which is helpful for obtaining a more reasonable and precise logic relation, so as to achieve stream rearrangement of the formatted document based on the logic relation.

In above-mentioned technical scheme, preferably, the cutline element extraction unit comprises: an information reading subunit, used to read preset typesetting characteristic information of the cutline element; an element retrieving subunit, used to retrieve in the text elements parsed by the document parsing unit according to the read typesetting characteristic information to obtain the cutline element.

In this technical scheme, a cutline element has typesetting characteristic information, such as font, beginning with keywords such as "figure", centering, word limit, positional relationship with other characters and so on, through these characteristic information, it is either possible to find the element corresponding to a content, and also possible to avoid taking, for instance, "figure 1" in the text as a cutline element (specifically, a figure title, or also can be explanatory characters, etc.), so as to precisely obtain a cutline element.

According to another aspect of the present invention, a method for logically processing a composite graph in a formatted document is also provided, which comprises: a composite graph block extraction step 202, extracting a composite graph block in a formatted document; a cutline element extraction step 204, extracting a cutline element from a text element parsed from the formatted document; a correlativity detection step 206, detecting correlativity between the composite graph block and the cutline element; a correlativity storing step 208, storing the detected correlativity.

In this technical scheme, the composite graph block includes a picture and a character in or around the picture etc. in the formatted document. Extracting the composite graph block refers to taking the picture and the character as a whole, and split it from a portion of the formatted document such as the text, etc., so as to carry out an appropriate typesetting process to the composite graph while rearranging the stream of the formatted document. However, due to typesetting the document, an interval between the picture and the cutline (for instance, located below the picture, including the title of the figure or the texts describing the picture, etc.) is far. In order to extract the composite graph block accurately, the cutline will be separated from the picture, which means, the picture is split to a composite graph block, while the picture is reserved to another partial of the formatted document, which leading to the fact that although splitting is achieved in the physical structure, there is still a problem existing in the logic structure. The scheme therefore establishing correlativity between the composite graph block and the cutline element, so as to establish a relation between the composite graph block and the cutline element in the logic structure. Thus makes the process of splitting a composite graph in a formatted document being more precise and reasonable.

In above-mentioned technical scheme, preferably, before the correlativity detection step 206, further comprises: obtaining the characteristic attribute information of the composite graph block, so as to classify the elements contained in the composite graph block; reserving the in-text-illustration composite graph in the composite graph block and filtering other elements according to classification result, so as to in the correlativity detection step 206, detecting the correlativity between the in-text-illustration composite graph and the cutline element.

In this technical scheme, the composite graph block contains an in-text-illustration composite graph and other elements, such as a figure trademark, a formula, a column line, a header, a footer, a decorative composite graph, etc., these elements may result in impacting the determination on a real scope corresponding to the in-text-illustration composite graph while determining the scope corresponding to the composite graph area. For example, the scope corresponding to the in-text-illustration composite graph is determined by its minimal circum-rectangle. If not filtering other elements, it might cause the rectangle being larger than its actual scope, thus the content that is not a cutline element might be regarded as a cutline element incorrectly, which results in a logic error.

In above-mentioned technical scheme, preferably, further comprising: adding a corresponding logic label to each element in the composite graph block, to symbolize each element's classification; and the correlativity storing step 208 further comprising storing the logic label and/or an identification of the element corresponding to the logic label.

In this technical scheme, adding a logic label to each element, so as to view and manage the logic correlativity corresponding to various elements, thus obtains a better display effect after stream transforming the formatted document.

In above-mentioned technical scheme, preferably, the step 206 comprises: if the composite graph block contains only one in-text-illustration composite graph, selecting a cutline element that distances to the in-text-illustration composite graph smaller than a preset distance, using it as a cutline element relating to the in-text-illustration composite graph; if the composite graph block contains multiple in-text-illustration composite graphs, taking the multiple in-text-illustration composite graphs and all of the parsed cutline elements as a vertex of a bipartite graph respectively, so as to utilize the bipartite graph to determine the correlativity between the multiple in-text-illustration composite graphs and the cutline elements.

In this technical scheme, using a close distance principle and a dichotomy optimal matching method to realize recognition of the correlativity between the in-text-illustration composite graph and the cutline elements, which is helpful to obtain a more reasonable and precise logic relation, so as to achieve stream rearrangement of the formatted document based on the logic relation.

In above-mentioned technical scheme, preferably, the step 204 comprises: reading preset typesetting characteristic information of the cutline element; retrieving in the parsed text elements according to the read typesetting characteristic information to obtain the cutline element.

In this technical scheme, a cutline elements has typesetting characteristic information, such as font, beginning with keywords such as "figure", centering, word limit, positional relationship with other characters and so on, through these characteristic information, it is either possible to find the element corresponding to a content, and also possible to avoid taking, for instance, "figure 1" in the text as a cutline element (specifically, a figure title, or also can be explanatory characters, etc.), so as to precisely obtain a cutline element.

Through the above technical scheme, it is possible to perform an appropriate logic process to the composite graph which is split from a formatted document, make it is easy to achieve layout understanding to the composite graph in a graph-text mixed arrangement layout in formatted document, so as to avoid a logic error.

BRIEF DESCRIPTION OF THE DRAWINGS

FIG. 5A and FIG. 5B show a schematic diagram of the method for logically processing a composite graph in a formatted document according to another embodiment of the present invention.

DETAILED DESCRIPTION

In order to understand above-mentioned goals, characteristics and ad vantages of the present invention more clearly, a further detailed description of the present invention in reference to the figures and preferred embodiments will be made below. It should be noted that, in the case that not conflicting, the embodiments and the characteristics in the embodiment of the present application can be combined with each other.

In the following description, a number of specific details are set forth in order to fully understand the present invention, but the present invention can also be implemented by other methods that are different from the method described herein, therefore, the present invention is not restricted by the specific embodiments disclosed below.

Figure 1:
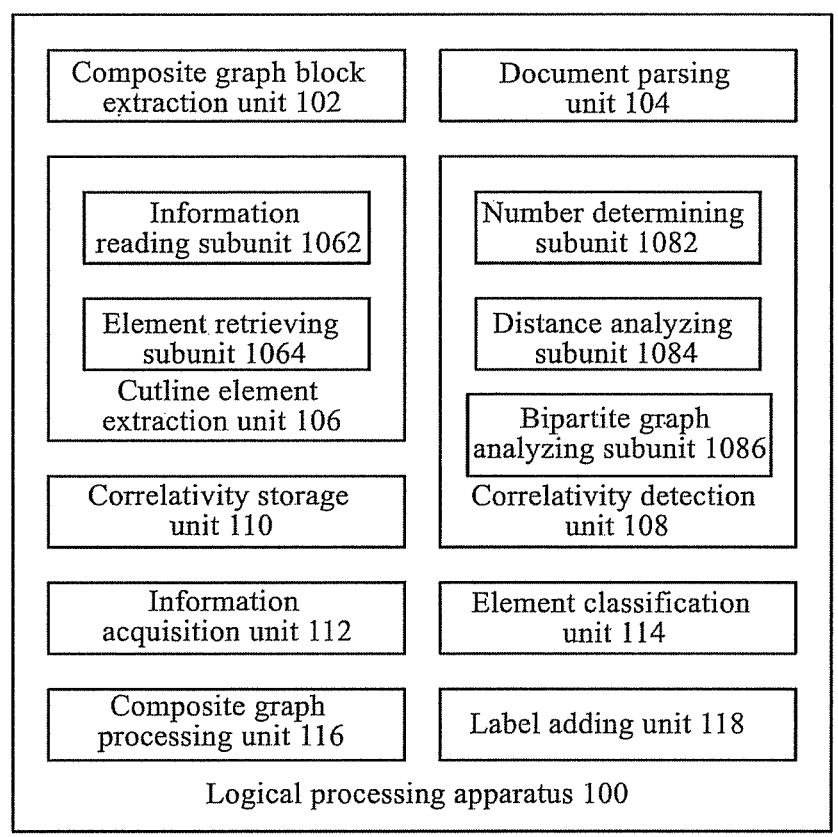
FIG. 1 shows a block diagram of the apparatus for logically processing a composite graph in a formatted document according to embodiment of the present invention.

FIG. 1 shows a block diagram of the apparatus for logically processing a composite graph in a formatted document according to embodiment of the present invention.

As shown in FIG. 1, the apparatus 100 for logically processing the composite graph in the formatted document according to the embodiment of the present invention comprises: a composite graph block extraction unit 102, used to extract the composite graph block in the formatted document; a document parsing unit 104, used to parse the formatted document to obtain a text element included therein; a cutline element extraction unit 106, used to extract a cutline element from the text element; a correlativity detection unit 108, used to detect correlativity between the composite graph block and the cutline element; a correlativity storage unit 110, used to store the detected correlativity.

In this technical scheme, the composite graph block includes a picture and a character in or around the picture, etc. in the formatted document. Extracting the composite graph block refers to taking these pictures, characters as a whole, and split it from a portion of the formatted document, such as the text, etc., so as to perform an appropriate typesetting process to the composite graph while rearranging the stream of the formatted document. However, due to typesetting the document, an interval between the picture and the cutline (for instance, located below the picture, including the title of the figure or the texts describing the picture, etc.) is far. In order to extract the composite graph block accurately, the cutline will be separated from the picture, which means, the picture is split to a composite graph block, while the picture is reserved to another partial of the formatted document, which leading to the fact that although splitting is achieved in the physical structure, there is still a problem existing in the logic structure. Therefore, the scheme establishes correlativity between the composite graph block and the cutline element, so as to establish a relation between the composite graph block and the cutline element in logic structure. Thus makes the process of splitting a composite graph in formatted document being more precise and reasonable.

In above-mentioned technical scheme, preferably, the apparatus 100 further comprises: an information acquisition unit 112, used to obtain the characteristic attribute information of the composite graph block; an element classification unit 114, used to classify the elements contained in the composite graph block according to the characteristic attribute information; a composite graph processing unit 116, used to reserve the in-text-illustration composite graph in the composite graph block and filter other elements according to classification result, so as to be used by the correlativity detection unit 108 to detect correlativity between the in-text-illustration composite graph and the cutline element.

In this technical scheme, the composite graph block contains an in-text-illustration composite graph and other elements, such as a figure trademark, a formula, a column line, a header, a footer, a decorative composite graph, etc., these elements may result in impacting the determining the real scope corresponding to the in-text-illustration composite graph while determining the scope corresponding to the composite graph area. For example, the scope corresponding to the in-text-illustration composite graph is determined by its minimal circum-rectangle. If not filtrating other elements, it may cause the rectangle being larger than its actual scope, thus the contents that are not cutline elements might be regarded as the cutline elements incorrectly, which results in logic errors.

In above-mentioned technical scheme, the apparatus 100 preferably further comprises: a label adding unit 118, used to add a corresponding logic label to each element in the composite graph block, to symbolize its class; and the correlativity storage unit 110 is also used to store the identification of the logic label and/or the element corresponding to the logic label.

In this technical scheme, adding a logic label to each element, so as to view and manage the logic relativity corresponding to various elements, thus obtains a better display effect after stream transforming the formatted document.

In above-mentioned technical scheme, preferably, the correlativity detection unit 108 comprises: a number determining subunit 1082, used to determine the number of in-text-illustration composite graphs contained in the composite graph block; a distance analyzing subunit 1084, in the case that the composite graph block contains only one in-text-illustration composite graph, the distance analyzing subunit 1084 selects the cutline element that has a distance to the in-text-illustration composite graph smaller than a preset distance, and use this cutline element as the cutline element relating to the in-text-illustration composite graph; a bipartite graph analyzing subunit 1086, if the composite graph block contains multiple in-text-illustration composite graphs, the bipartite graph analyzing subunit 1086 makes the multiple in-text-illustration composite graphs and all of the parsed cutline elements as a vertex of a bipartite graph respectively, so as to utilize the bipartite graph to determine correlativity between the multiple in-text-illustration composite graphs and the cutline elements.

In this technical scheme, using a close distance principle and a dichotomy optimal matching method to realize recognition of the correlativity between the in-text-illustration composite graph and the cutline elements, which helps to get a more reasonable and precise logic relation, so as to achieve stream rearrangement of formatted document based on the logic relation.

In above-mentioned technical scheme, preferably, the cutline element extraction unit 106 comprises: an information reading subunit 1062, used to read preset typesetting characteristic information of the cutline element; an element retrieving subunit 1064, used to retrieve in the text elements that parsed by the document parsing unit 104 according to the read typesetting characteristic information to obtain the cutline element.

In this technical scheme, a cutline elements has typesetting characteristic information, such as font, beginning with keywords such as "figure", centering, word limit, positional relationship with other characters and so on, through these characteristic information, it is either possible to find the element corresponding to a content, and also possible to avoid taking, for instance, "figure 1" in the text as the cutline element (specifically, a figure title, or also can be explanatory characters, etc.), so as to precisely obtain a cutline element.

Figure 2:
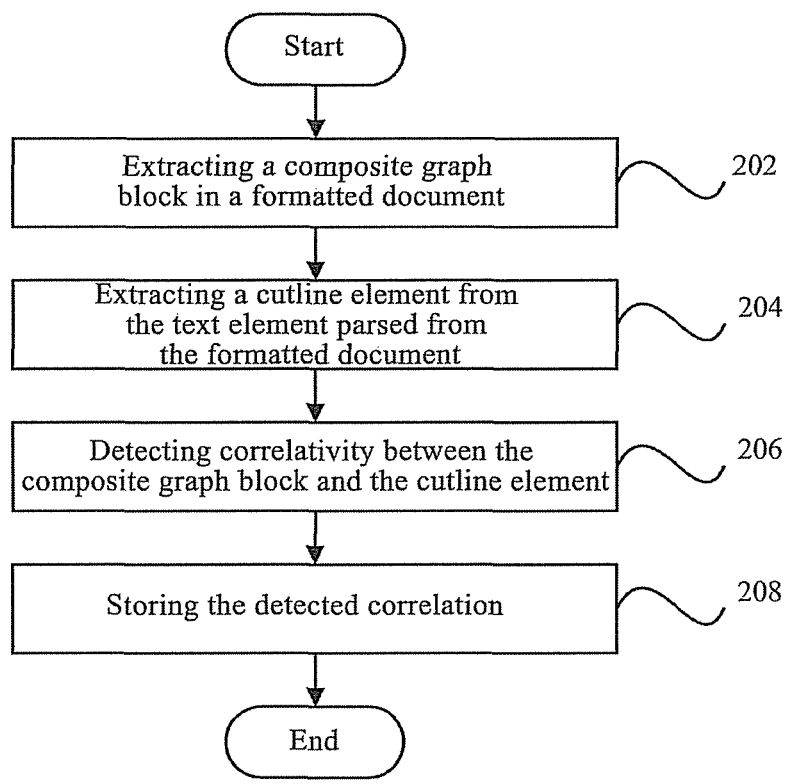
FIG. 2 shows a flow chart of the method for logically processing a composite graph in a formatted document according to embodiment of the present invention.

FIG. 2 shows a flow chart of a method for logically processing a composite graph in a formatted document according to embodiment of the present invention.

As shown in FIG. 2, the method for logically processing a composite graph in a formatted document according to embodiment of the present invention, comprises: step 202, extracting the composite graph block in the formatted document; step 204, extracting a cutline element from the text element that parsed from the formatted document; step 206, detecting correlativity between the composite graph block and the cutline element; step 208, storing the detected correlativity.

In this technical scheme, the composite graph block includes a picture and a characters that in or around the picture etc. in the formatted document. Extracting the composite graph block refers to taking the picture and the character as a whole, and split it from a portion of the formatted document such as the text, etc., so as to perforin an appropriate typesetting process to the composite graph while rearranging the stream of the formatted document. However, due to typesetting the document, an interval between picture and the cutline (for instance, located below the picture, including the title of the figure or texts for describing the picture, etc.) is far. In order to extract the composite graph block accurately, the cutline will be separated from the picture, which means, the picture is split to composite graph block, while the picture is reserved to another partial of the formatted document, which leading to the fact that although splitting is achieved in the physical structure, there is still a problem existing in the logic structure. Therefore, the scheme establishing correlativity between the composite graph block and the cutline element, to establish a relation between the composite graph block and the cutline element in the logic structure. Thus makes the process of splitting a composite graph in a formatted document being more precise and reasonable.

In above-mentioned technical scheme, preferably, before the step 206, further comprises: obtaining the characteristic attribute information of the composite graph block, so as to classify the elements that contained in the composite graph block; reserving the in-text-illustration composite graph in the composite graph block and filtering other elements according to the classification result, so as to in the step 206, detecting the correlativity between the in-text-illustration composite graph and the cutline element.

In this technical scheme, the composite graph block contains an in-text-illustration composite graph and other elements, such as a figure trademark, a formula, a column line, a header, a footer, a decorative composite graph, etc., these elements may result in impacting the determination on a real scope corresponding to the in-text-illustration composite graph while determining the scope corresponding to the composite graph area. For example, the scope corresponding to the in-text-illustration composite graph is determined by its minimal circum-rectangle. If not filtering other elements, it may cause the rectangle being larger than its actual scope, thus the content that is not a cutline element might be regarded as a cutline element incorrectly, resulting in logic errors.

In above-mentioned technical scheme, preferably, further comprises: adding a corresponding logic label to each element in the composite graph block, to symbolize its class; and the step 208 further comprises: storing an identification of the logic label and/or an element corresponding to the logic label.

In this technical scheme, by adding logic label to each element, so as to proceed with viewing and managing to the logic relationship corresponding to various elements, thus achieve obtaining better display effect after perform streaming transform to the formatted document.

In above-mentioned technical scheme, preferably, the step 206 comprises: if the composite graph block contains only one in-text-illustration composite graph, selecting a cutline element that has a distance to the in-text-illustration composite graph smaller than a preset distance, using it as a cutline element relating to the in-text-illustration composite graph; if the composite graph block contains multiple in-text-illustration composite graphs, taking the multiple in-text-illustration composite graphs and all of the parsed cutline elements as a vertex of a bipartite graph respectively, so as to utilize the bipartite graph to determine the correlativity between the multiple in-text-illustration composite graphs and the cutline elements.

In this technical scheme, using a close distance principle and a dichotomy optimal matching method to realize recognition of the correlativity between the in-text-illustration composite graph and the cutline elements, which helps to get a more reasonable and precise logic relation, so as to achieve stream rearrangement of the formatted document based on the logic relation.

In above-mentioned technical scheme, preferably, the step 204 comprises: reading the preset typesetting characteristic information of the cutline element; retrieving in the parsed text elements according to the read typesetting characteristic information to obtain the cutline element.

In this technical scheme, a cutline element has typesetting characteristic information, such as font, beginning with keywords such as "figure", centering, word limit, positional relationship with the other characters and so on, through these characteristic information, it is either possible to find the element corresponding to a content, and also possible to avoid taking, for instance, "figure 1" in the text as a cutline element (specifically, a figure title, or also can be explanatory characters, etc.), so as to precisely obtain a cutline element.

Figure 3:
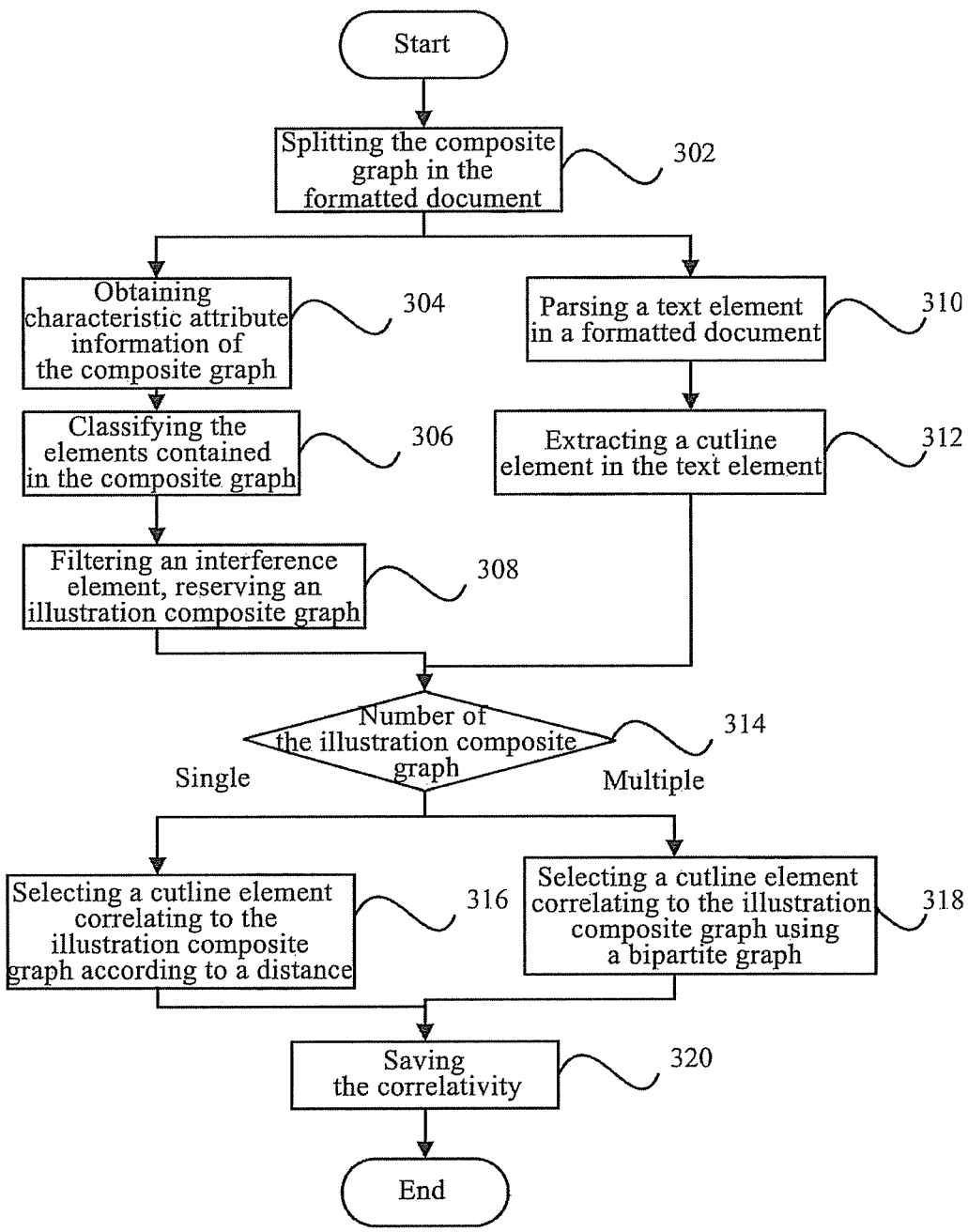
FIG. 3 shows a specific flow chart of the method for logically processing a composite graph in a formatted document according to embodiment of the present invention.

FIG. 3 shows a specific flow chart of logically processing a composite graph in a formatted document according to the embodiment of the present invention.

As shown in FIG. 3, the specific flow chart of logically processing the composite graph in the formatted document according to embodiment of the present invention comprises:

Step 302, splitting the composite graph in the formatted document, specifically, the split composite graph may contains an illustration composite graph, may also contains other elements such as a decorative composite graph, a column line, etc.

After complete splitting, IDs of all the elements in the split composite graph can be stored, such as stored into an XML document, so as to find the composite graph according to the stored element ID when invoke or process the composite graph.

In practice, above-mentioned process of splitting the composite graph is to split the block corresponding to the composite graph from the formatted document only in the physical structure, which does not include analyzing its logic structure. Therefore, it is more often to perform correlating according to the physical characteristic, such as the distance between an image and a character, etc. while splitting in a normal formatted document structure, thus results in the split composite graph not containing a picture.

In below steps, correlating the composite graph with the picture "left" in the formatted document accurately will be completed, thus logically processes the composite graph will be accomplished.

Step 304 to step 308 are the steps to process the composite graph:

Step 304, obtaining the characteristic attribute information of the composite graph. Specifically, relates to extracting the characteristics such as the layout of the composite graph in a page space, style information and texture of the content image, etc., specific characteristics are shown as table 1:

TABLE 1

| 1 | Height | Height of the composite graph |
|---|---|---|
| 2 | Width | Width of the composite graph |
| 3 | Area | Area of the composite graph |
| 4 | Eccentricity | Eccentricity of the composite graph |
| 5 | BlkPix | Percentage of black pixels in the composite graph |
| 6 | Std | Standard deviation of the gray value of each pixel in the composite graph |
| 7 | Entropy | Image entropy, measuring the image information quantum |
| 8 | Contrast | Moment of inertia, reflecting a degree of clearness of the image texture |
| 9 | Correlation | Dependency, measuring the dependency of the texture in one certain direction |
| 10 | Energy | Angular second moment, measuring the uniformity of gray level distribution |
| 11 | Homogeneity | Inverse difference moment, reflecting the uniformity of part of the image |

At the same time, according to the characteristic of the texture of an actual composite graph, selecting a distance and a direction to calculate the gray level co-occurrence matrix and a characteristic coefficient, using the characteristic coefficients to compose a texture characteristic vector as an input of a statistic classifier.

Step 306, classifying the element contained in the composite graph. Specifically, using SVM (Support Vector Machine) as a classifier, selecting RBF (Radial Basis Function) to classify various elements that included in the split composite graph, these elements are, such as, a illustration composite graph, a figure trademark, a formulas, a column line, a header, a footer, a decorative composite graph, etc., symbolizing each element according to the classification result to get its logic label in the layout.

Step 308, filtering an interference element, reserving the illustration composite graph. Specifically, this refers to filtering objects of a figure trademark, a formula, a column line, a header, a footer, a decorative composite graph, the existence of a large number of these composite graphs impacts correlating between the illustration composite graph and the picture in the text.

Step 310 and step 312 are processing the text element:

Step 310, parsing the formatted document to obtain the parsed text element.

Step 312, extracting the cutline element in the text element. Specifically, the cutline element can be distinguished from the characters of the text according to the characteristic attribute of the character of the cutline element, taking the figure title as example, its font is smaller than that of the characters of the text, begins with keywords, such as "figure/Figure/Fig", "figure/Figure/Fig 1", "figure/Figure/Fig 1-1", etc., which can be expressed by regular expression.

At the same time, the extracted the figure title may also be a quote of the figure in the text, thus, it is possible to filter the quote of a candidate figure title in the text according to the typesetting characteristic of the cutline text, such as centering set, word limit of each paragraph, etc.

Step 314, determining the number of the illustration composite graph in the current composite graph block, if it is one, proceed to step 316, otherwise proceed to step 318.

Step 316, selecting the cutline elements relating to the illustration composite graph according to a distance. Specifically, take the figure title as an example, in a case that a page contains a single illustration composite graph and a single (or multiple) figure title(s), i.e. a one-to-one (or one-to-many) mode, adopting a close distance principle, to select the figure title that has the closest distance to the illustration composite graph as the title of the illustration composite graph.

Step 318, utilizing a bipartite graph method to select a cutline element relating to the illustration composite graph. Specifically, in a case that a page contains multiple illustration composite graphs and multiple figure titles, it is not possible to only dependent on the distance and the style of the figure title, whereas, adopting a bipartite graph method to express the illustration composite graph and the figure titles as a vertex of a bipartite graph respectively, defining a correlation weight between the vertexes according to the distance between the figure title and the illustration composite graph, then, finding the most probable correlation scheme for the illustration composite graph and the figure title by finding the maximum weight matching of the bipartite graph, so as to obtain a global optimal correlation matching.

Step 320, saving the correlation of the illustration composite graph and the figure title. In addition, it is also possible to save the classification result in step 306 to get the logic label of each element in the composite graph in the layout, and the element ID collection of the element corresponding to each logic class. Specifically, this can be stored in an XML form.

Several embodiments will be present in the following, to describe the technical solutions of the present invention in detail, respectively.

Figure 4A:
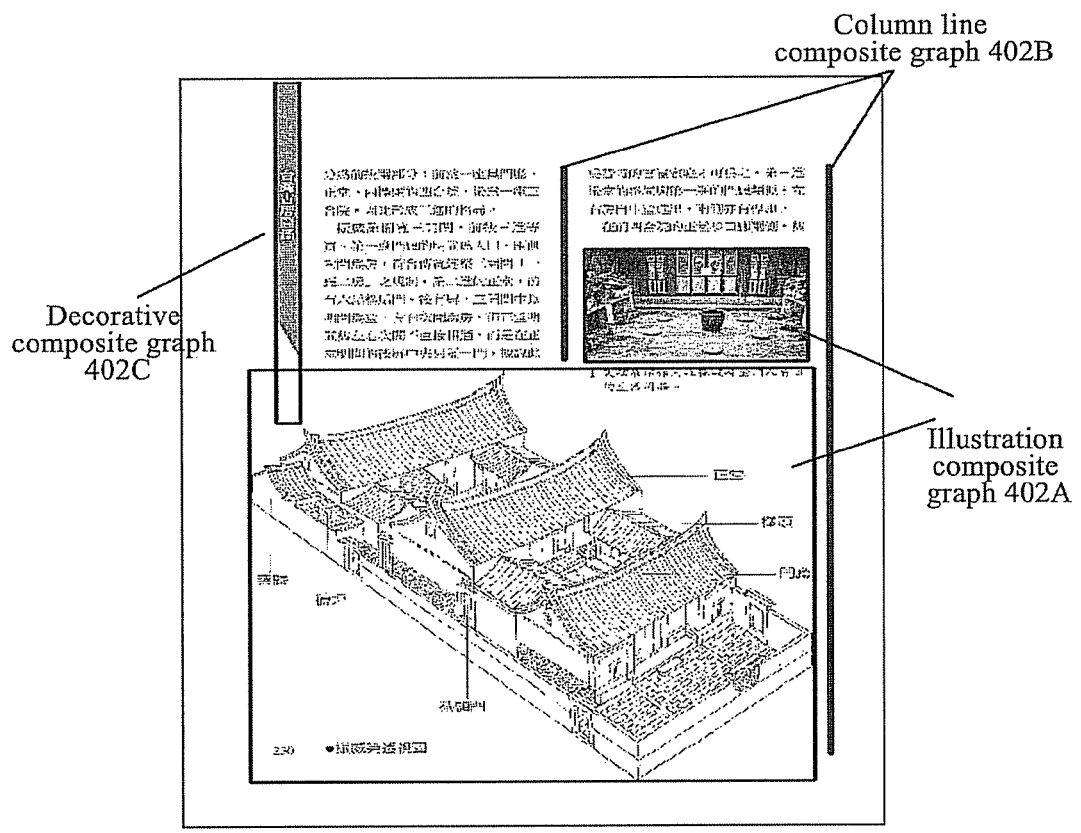
FIG. 4A and FIG. 4B show a schematic diagram of the method for logically processing a composite graph in a formatted document in Chinese according to one embodiment of the present invention.
Figure 4B:
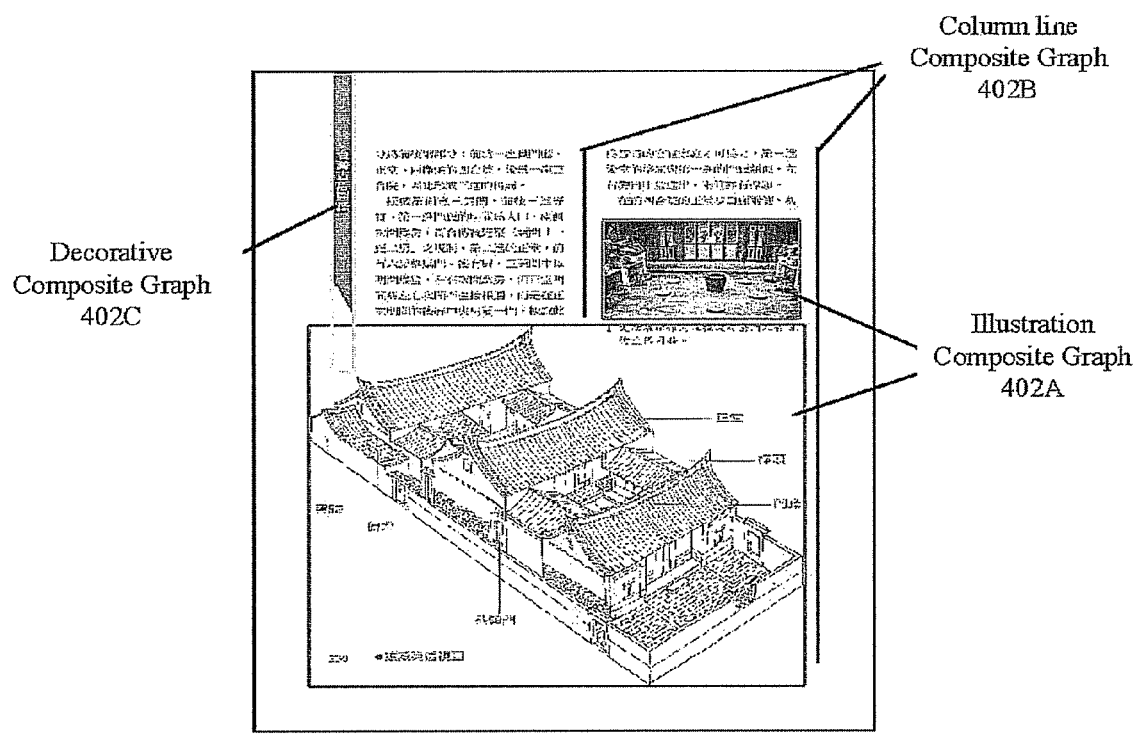

FIG. 4A and FIG. 4B showing a schematic diagram of logically processing the composite graph in a formatted document in Chinese according to one embodiment of the present invention.

As shown, take a double column page in the Chinese formatted document book "Illustrations of Taiwan History" ("台灣古厝圖鑑") as an example, by the process of splitting the figure, a composite graph block comprising an illustration composite graph 402A, a column line composite graph 402B and a decorative composite graph 402C is extracted. All of the element ID in the composite graph block can be stored in an XML document, so as to process the composite graph block. Below, a logical process to the composite graph in the page will be present with reference to the workflow shown in FIG. 3.

First, after obtained various elements of the formatted document by a parsing engine, performing a layout analysis to the document, the split result of the composite graph block in the layout analysis is read from the XML document, which comprising reading its circum-rectangle and combining the element ID collection of the composite graph. Specifically, the effect of drawing the circum-rectangle in the page is shown in FIG. 4A.

Then, extracting the characteristic attribute information of all of the composite graphs in the page, such as the layout, the style information and the texture of the content image, etc., specifically, the main characteristic attribute information is shown in table 1. Classifying 5 composite graphs in this page by taking the characteristic attribute information as the input of a trained statistical classifier SVM, and symbolizing a logic label according to the classification result. Specifically, the classification result is shown in FIG. 4B. This page contains three kinds of composite graph logic labels, among which, there are 2 illustration composite graphs 402A in the text, 2 column line composite graphs 402B and one decorative composite graphs 402C on the edge of the left page. The illustration composite graphs 402A beneath the text page and the decorative composite graph 402C on the edge of the left page include text elements and a large number of path operations, which is difficult to split and with a low recognition rate. However, adopting the method of the present invention, the composite graphs of the page are precisely labeled with the logic category labels. The logic symbolization result can be used in a stream rearrangement application of the formatted document directly.

In above-mentioned embodiment, the process of symbolizing the logic label of the composite graphs that are split from the formatted document has been mainly described. The scheme of correlating the composite graph with the cutline will be illustrated below by another embodiment.

Figure 5A:
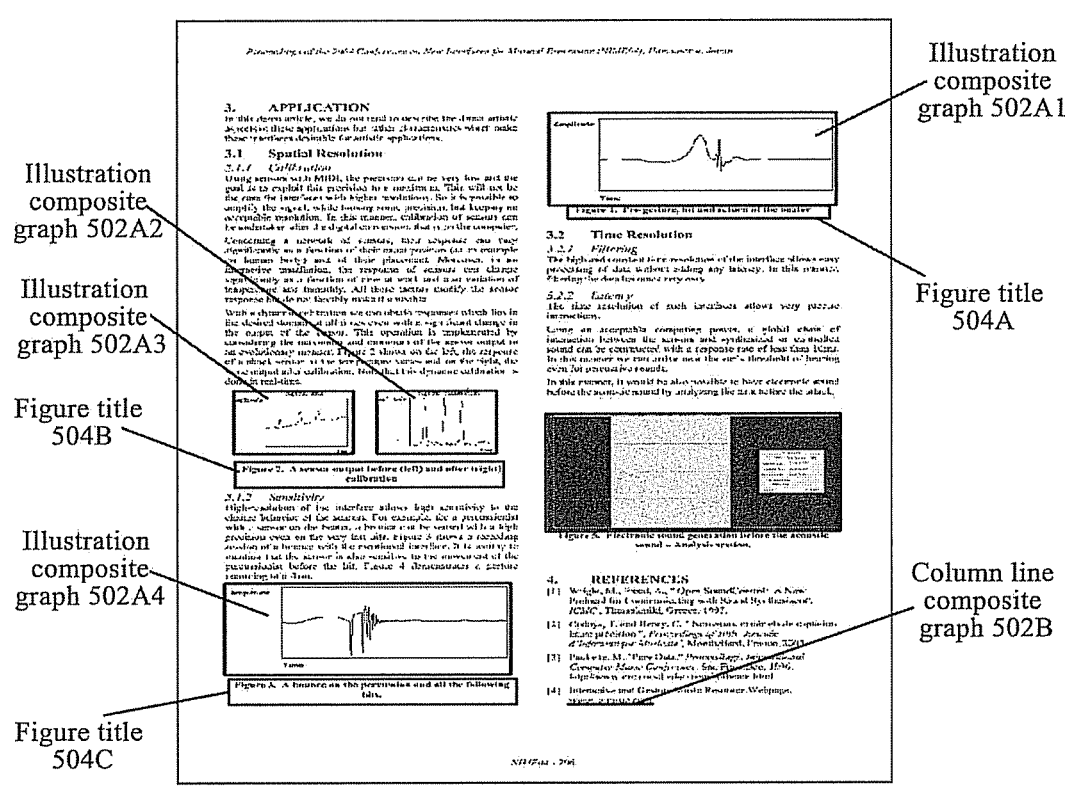
Figure 5B:
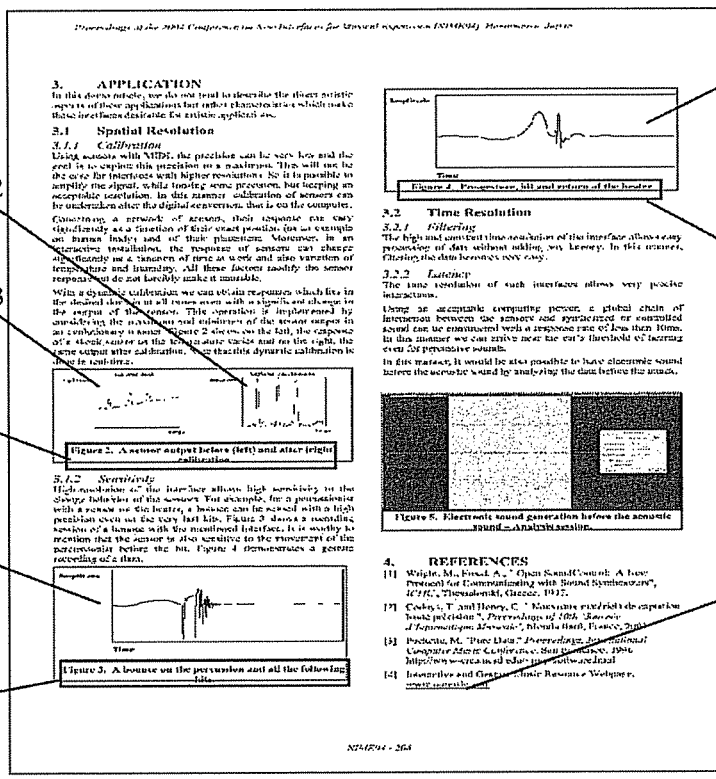

FIG. 5A and FIG. 5B showing a schematic diagram for logically processing the composite graph in a formatted document according to another embodiment of the present invention.

As shown, taking a double column page of English formatted document thesis "TOASTER and KROONDE: High-Resolution and High-Speed Real-time Sensor Interfaces" as an example, by splitting the figure, a composite graph block comprising the illustration composite graph 502A1, the illustration composite graph 502A2, the illustration composite graph 502A3, the illustration composite graph 502A4 and the column line composite graph 502B are split. All of the element IDs in the composite graph block can be stored in an XML document, so as to process the composite graph block. Below, the logic process to the composite graph in the page will be performed according to the work flow shown in FIG. 3.

First, after obtained various elements of the formatted document by a parsing engine, proceeding with a layout analysis to the document, the split result of the composite graph block in the layout analysis is read from the XML document, comprising reading its circum-rectangle and combining the element ID collection of this composite graph. Specifically, the effect of drawing the circum-rectangle in the page is shown in FIG. 5A.

Then, processing the composite graph block. Specifically, proceed with a classification analysis to all elements that contained in the composite graph block, and reserve the illustration composite graph according to the analysis result, while filter the figure trademark, the formula, the column line, the header, the footer, the decorative composite graph in the page, the existence of these composite graphs impacts correlating and recognizing the illustration composite graph and the figure title and the cutline in the text.

At the same time, also including: obtaining the cutline information, herein, for example, obtaining a figure title. From the parsed character element of the formatted document, it is possible to extract information about the figure title according to the characteristic attribute of the character (such as beginning with a keyword "Figure" in this page) and characteristic attribute of typesetting (such as centering set) of the figure title, and filter the quote of the candidate figure title in the text. Specifically, the figure title 504A, the figure title 504B, the figure title 504C, etc. shown in the figure can be obtained by analyzing.

Finally, setting the correlation to the illustration composite graph and the figure title. Specifically, a bipartite graph method is adopted since the page containing multiple illustration composite graphs, the illustration composite graph and the figure title are expressed as the vertex of a bipartite graph respectively, defining a correlation weight between the vertexes according to the distance between the figure title and the figure, then, finding the maximum weight matching of bipartite graph, so as to find the most probable correlation of the chart and its title. The input of the page have 6 composite graphs, as shown in FIG. 5B, the column line composite graph located in the lower right of the page is filtered, after 2 illustration composite graphs located in the left column are merged, 4 illustration composite graphs and 4 figure titles in the page are correlated. The result can be used in the stream rearrangement application of a formatted document directly.

The technical scheme of the present invention has been described in details in the above, the present invention parsing and analyzing the metadata information embedded in the formatted document (such as a PDF document), after splitting the composite graphs that contained in the page, extracting the characteristics (such as the layout of page space, the style information and the texture of content image, etc.) of all composite graphs in the page, being the input of a SVM classifier, logically symbolizing the composite graphs according to the category of classification. At the same time, extracting the candidate figure title from the parsed character elements of the formatted document, performing correlativity recognition to the illustration composite graph and its figure title by adopting a close distance principle and a dichotomy optimal matching method. Ensuring the cutline staying synchronized with the images i.e. keeping joined after the images in the formatted document have been transformed into a stream document, thus finally, achieve the fact a fixed formatted document is rearranged to a consistent streaming document in a reading order.

The foregoing is only preferred embodiments of the present invention, it is not intended to limit the invention, it is clear for those skilled in the art that the present invention may has a various changes and modification. Any modification, equivalent replacement, improvement, etc. that made within the spirit and principle of the present invention should be included in the scope of protection of the present invention.

What is claimed is:

1. An apparatus for logically processing a composite graph in a formatted document, comprising a computer processor and a computer readable storage medium which stores a plurality of computer-executable instructions, wherein the computer-executable instructions, when being executed by the computer processor, cause the computer processor to:

extract a composite graph block in the formatted document;
parse the formatted document to obtain a text element included therein;
extract a cutline element from the text element;
detect correlativity between the composite graph block and the extracted cutline element, wherein the correlativity detection comprises:
  determining the number of in-text-illustration composite graphs included in the composite graph block;
  in the case that the composite graph block only contains one in-text-illustration composite graph, selecting a cutline element having a distance to the one in-text-illustration composite graph smaller than a preset distance, and making the selected cutline element as a cutline element relating to the one in-text-illustration composite graph; and
  in the case that the composite graph block contains multiple in-text-illustration composite graphs, making the multiple in-text-illustration composite graphs and all of the parsed cutline elements as a vertex of a bipartite graph respectively, so as to use the bipartite graph to determine the correlativity between the multiple in-text-illustration composite graphs and the cutline elements; and
store the detected correlativity.

2. The apparatus for logically processing a composite graph in a formatted document according to claim 1, wherein the computer-executable instructions, when being executed by the computer processor, further cause the computer processor to:

obtain characteristic attribute information of the composite graph block;
classify an element included in the composite graph block, according to the characteristic attribute information; and
reserve an in-text-illustration composite graph in the composite graph block and filter other elements according to classification result, so as to detect the correlativity between the reserved in-text-illustration composite graph and the cutline element.

3. The apparatus for logically processing a composite graph in a formatted document according to claim 2, wherein the computer-executable instructions, when being executed by the computer processor, further cause the computer processor to:

add a corresponding logic label to each element in the composite graph block, to symbolize the classification each element belonging to; and
store one or both of the logic label and an identification of the element corresponding to the logic label.

4. The apparatus for logically processing a composite graph in a formatted document according to claim 1, wherein the computer-executable instructions, when being executed by the computer processor, cause the computer processor to:

read preset typesetting characteristic information of the cutline element; and
retrieve in it a parsed text element according to the read typesetting characteristic information to obtain the cutline element.

5. A method for logically processing a composite graph in a formatted document, comprising:

extracting, by an apparatus, a composite graph block in a formatted document;
extracting a cutline element from a text element parsed from the formatted document;

detecting correlativity between the composite graph block and the extracted cutline element, wherein the correlativity detection comprises:
- if the composite graph block only contains one in-text-illustration composite graph, selecting a cutline element having a distance to the one in-text-illustration composite graph smaller than a preset distance, and using the cutline element having the distance to the one in-text-illustration composite graph smaller than the preset distance as a cutline element correlating to the one in-text-illustration composite graph; and
- if the composite graph block contains multiple in-text-illustration composite graphs, making the multiple in-text-illustration composite graphs and all of the parsed cutline elements as a vertex of a bipartite graph respectively, so as to use the bipartite graph to determine the correlativity between the multiple in-text-illustration composite graphs and the cutline elements; and store the detected correlativity.

6. The method for logically processing a composite graph in a formatted document according to claim 5, before the detecting of the correlativity between the composite graph block and the cutline element, further comprises:

obtaining characteristic attribute information of the composite graph block, so as to classify an element contained in the composite graph block; and reserving an in-text-illustration composite graph in the composite graph block according to classification result, and filtering other elements, so as to detect the correlativity between the reserved in-text-illustration composite graph and the cutline element.

7. The method for logically processing a composite graph in a formatted document according to claim 6, further comprises:

adding a corresponding logic label to each element in the composite graph block to symbolize each element's classification; and the storing of the detected correlativity further comprising storing one or both of the logic label and an identification of the element corresponding to the logic label.

8. The method for logically processing a composite graph in a formatted document according to any of claim 5, wherein the extracting the cutline element from the text element parsed from the formatted document comprises:

reading preset typesetting characteristic information of the cutline element; and retrieving in a parsed text element to obtain the cutline element, according to the read typesetting characteristic information.

* * * * *